US011987966B2

(12) United States Patent
Fei et al.

(10) Patent No.: US 11,987,966 B2
(45) Date of Patent: May 21, 2024

(54) PORTABLE PIPE DREDGING MACHINE AND DREDGING METHOD

(71) Applicant: Hangzhou Hongli Pipe Machinery Co., Ltd, Hangzhou (CN)

(72) Inventors: Chenchen Fei, Hangzhou (CN); Hongwu Xie, Hangzhou (CN)

(73) Assignee: Hangzhou Hongli Pipe Machinery Co., Ltd, Hangzhou (CN)

( * ) Notice: Subject to any disclaimer, the term of this patent is extended or adjusted under 35 U.S.C. 154(b) by 148 days.

(21) Appl. No.: 17/939,988

(22) Filed: Sep. 8, 2022

(65) Prior Publication Data

US 2023/0193609 A1 Jun. 22, 2023

(30) Foreign Application Priority Data

Dec. 21, 2021 (CN) ......................... 202111575919.X

(51) Int. Cl.
*E03C 1/302* (2006.01)
*B08B 9/045* (2006.01)

(52) U.S. Cl.
CPC .............. *E03C 1/302* (2013.01); *B08B 9/045* (2013.01); *B08B 2209/04* (2013.01)

(58) Field of Classification Search
CPC ...... E03C 1/302; B08B 9/045; B08B 2209/04
See application file for complete search history.

(56) References Cited

U.S. PATENT DOCUMENTS 2,467,849 A * 4/1949 O'Brien .................. E03C 1/302 74/421 A
2020/0011039 A1* 1/2020 Yu ........................... B08B 9/045

FOREIGN PATENT DOCUMENTS

CN 2208989 Y 10/1995
CN 2328709 Y 7/1999
CN 106638837 A * 5/2017 ............. E03C 1/302

OTHER PUBLICATIONS

Machine translation: CN106638837; Chang, J. (Year: 2017).*
Machine translation: CN 2208989; Wang, S. (Year: 1995).*

* cited by examiner

*Primary Examiner* — Natasha N Campbell
(74) *Attorney, Agent, or Firm* — Bayramoglu Law Offices LLC

(57) ABSTRACT

A portable drain cleaning machine includes a flexible shaft advancing and retreating device, a casing device, a motor device, a drum device, a flexible shaft, protection tubes, and a joint. The flexible shaft advancing and retreating device is connected with the protection tube. The protection tubes are connected with the casing device. Both the motor device and the drum device are arranged in the casing device. The motor device cooperates with the drum device. The flexible shaft includes one end connected with the drum device and the other end arranged in a funnel-shaped structure. The flexible shaft penetrates the flexible shaft advancing and retreating device and the protection tube. Any adjacent two of the protection tubes are connected by the joint. The drum device includes a drum body, a flexible shaft disc, and a motor connecting plate. The flexible shaft disc is arranged on the drum body.

10 Claims, 21 Drawing Sheets

VII-VII

III-III

V-V

VI-VI

PORTABLE PIPE DREDGING MACHINE AND DREDGING METHOD

CROSS REFERENCE TO THE RELATED APPLICATIONS

This application is based upon and claims priority to Chinese Patent Application No. 202111575919.X, filed on Dec. 21, 2021, the entire contents of which are incorporated herein by reference.

TECHNICAL FIELD

The present disclosure relates to a portable drain cleaning machine and a drain cleaning method and belongs to the field of drain cleaning equipment.

BACKGROUND

The portable small-scale household drain cleaning machine is a tool commonly used for cleaning household drains, characterized in that it typically dredges the pipe with a diameter less than 50 mm, and it is easy to carry, and has a more compact size compared with common drain cleaning machines. Currently, there are several types of small-scale drain cleaning machines. For a drain cleaning machine with a flexible shaft driven by a hand electric drill, it is not safe, and if the drain cleaning pollution is serious, it is difficult to dredge. For a larger drain cleaning machine with a small-diameter flexible shaft for drain cleaning, it is bulky and difficult to use.

In view of this, Chinese patent No. CN98214560.8 discloses a portable drain cleaning machine, and Chinese patent No. CN94217937.4 also discloses a portable drain cleaning machine. However, these two drain cleaning machines have low safety performance and lack a corresponding protection tube.

SUMMARY

An objective of the present disclosure is to overcome the above deficiencies in the prior art, and provide a portable drain cleaning machine with a reasonable structural design and a drain cleaning method.

A technical solution adopted by the present disclosure to solve the above problems is as follows. A portable drain cleaning machine is characterized by including: a flexible shaft advancing and retreating device, a casing device, a motor device, a drum device, a flexible shaft, protection tubes, and a joint. The flexible shaft advancing and retreating device is connected with the protection tube. The protection tubes are connected with the casing device. Both the motor device and the drum device are arranged in the casing device. The motor device cooperates with the drum device. The flexible shaft includes one end connected with the drum device and the other end arranged in a funnel-shaped structure. The flexible shaft penetrates the flexible shaft advancing and retreating device and the protection tube. Any adjacent two of the protection tubes are connected by the joint. The drum device includes a drum body, a flexible shaft disc, and a motor connecting plate. The flexible shaft disc is arranged on the drum body. The motor connecting plate is arranged on the flexible shaft disc. The motor connecting plate is connected with the motor device. One end of the flexible shaft is connected with the flexible shaft disc.

Further, the flexible shaft advancing and retreating device may include a handle body, a handle end cover, a handle grip, an advancing and retreating body, a feed mechanism, a retraction mechanism, and a plastic sleeve. The handle grip may cooperate with the advancing and retreating body. The advancing and retreating body may cooperate with the feed mechanism and the retraction mechanism. Both the feed mechanism and the retraction mechanism may be arranged in the handle body. The handle grip may penetrate the handle end cover. The handle end cover may be arranged on the handle body. The plastic sleeve may be arranged on the handle body.

Further, the feed mechanism may include a feed rocker arm, a feed pressure roller, three feed bearings, a feed torsion spring, a feed pin shaft, and a feed housing. The feed rocker arm may be arranged on the advancing and retreating body through the feed pin shaft. The feed torsion spring may be sleeved on the feed pin shaft. The feed rocker arm may be provided with the feed pressure roller and the feed bearing. The feed housing may be sleeved on the advancing and retreating body. The feed housing may be arranged in the handle body. The feed torsion spring may include one end abutting against the advancing and retreating body and the other end abutting against the feed rocker arm. The feed pressure roller may be in contact with the feed housing. The feed bearings may be arranged obliquely. The three feed bearings may form a flexible shaft feed channel. Two of the feed bearings may be arranged on the feed rocker arm, and the other feed bearing may be arranged on the advancing and retreating body.

Further, the retraction mechanism may include a retraction rocker arm, a retraction pressure roller, a retraction bearing, a retraction torsion spring, a retraction pin shaft, and a retraction housing. The retraction rocker arm may be arranged on the advancing and retreating body through the retraction pin shaft. The retraction torsion spring may be sleeved on the retraction pin shaft. The retraction rocker arm may be provided with the retraction pressure roller and the retraction bearing. The retraction housing may be sleeved on the advancing and retreating body. The retraction housing may be arranged in the handle body. The retraction torsion spring may include one end abutting against the advancing and retreating body and the other end abutting against the retraction rocker arm. The retraction pressure roller may be in contact with the retraction housing. The retraction bearing may be arranged obliquely. Three retraction bearings may be arranged. The three retraction bearings may form a flexible shaft retraction channel. Two of the retraction bearings may be arranged on the retraction rocker arm, and the other retraction bearing may be arranged on the advancing and retreating body.

Further, the casing device may include a casing, a cover, a flexible shaft sleeve, a motor clamping groove, a battery compartment, and a rubber pad. The cover may be arranged on the casing. The flexible shaft sleeve may be arranged on the cover. Both the motor clamping groove and the battery compartment may be arranged in the casing. The rubber pad may be arranged at a bottom of the casing.

Further, the casing may include a left casing and a right casing. The cover may be arranged on the left casing and the right casing. The casing may be provided with a lifting handle at a top and a line clamping plate at a rear. A line clamping groove may be arranged between the line clamping plate and the casing. A drum cavity configured to place the drum device may be arranged between the cover and the casing.

Further, the motor device may include a motor, a motor fixing plate, and a motor connecting shaft. The motor fixing plate may be arranged on the casing device. The motor may be arranged on the motor fixing plate. The motor connecting shaft may be arranged on an output shaft of the motor. The motor connecting shaft may be connected with the drum device. The motor may be located in a motor clamping groove.

Further, the drum device may further include a flexible shaft sleeve and a flexible shaft seat. The flexible shaft seat may be arranged on the drum body. The flexible shaft sleeve may be arranged on the flexible shaft seat. The flexible shaft sleeve may be sleeved outside the flexible shaft.

Further, the portable drain cleaning machine may further include a battery, a charger, an airbag switch, a rocker switch, and a power display. The battery may be arranged in the battery compartment. Both the rocker switch and the power display may be arranged on the casing. The battery, the airbag switch, and the rocker switch may be connected with a motor. The charger may be connected with the battery. The battery may be connected with the power display.

Further, another technical objective of the present disclosure is to provide a drain cleaning method of a portable drain cleaning machine.

The foregoing technical objectives of the present disclosure are achieved by using the following technical solutions.

A drain cleaning method of a portable drain cleaning machine is characterized by including:

rotating a handle body counterclockwise to make a feed housing contact a feed pressure roller to move a feed rocker arm downward, locking a flexible shaft by three feed bearings, driving a flexible shaft disc by a motor to rotate in a forward direction, and driving the flexible shaft by the feed bearings to rotate forward, so as to realize a feed function of the flexible shaft, where during reset, the feed rocker arm is capable of being reset upward through a feed torsion spring; and rotating the handle body clockwise to make a retraction housing contact a retraction pressure roller to move a retraction rocker arm downward, locking the flexible shaft by a retraction bearing, driving the flexible shaft disc by the motor to rotate in a forward direction, and driving the flexible shaft by the retraction bearing to rotate rearward, so as to realize a retraction function of the flexible shaft, where during reset, the retraction rocker arm is capable of being reset upward through a retraction torsion spring.

Compared with the prior art, the present disclosure has the following advantages. The portable drain cleaning machine is equipped with the flexible shaft advancing and retreating device and the protection tube. The flexible shaft uses a flexible shaft with a reinforced steel wire mandrel and a flexible shaft head arranged in a funnel-shaped structure. The fixed structure of the motor is stable, and the startup and operation are stable. The motor clamping groove is arranged, and the lithium battery and the direct current (DC) motor are equipped to realize the lithium battery drive. The casing is provided with the line clamping plate and the line clamping groove at the rear, which is convenient for storage. The transparent cover at the front of the machine is installed with all copper nuts, which is convenient for disassembly and assembly. The portable drain cleaning machine is equipped with forward and reverse switches. The forward switch is arranged as a setting switch, which can be operated by pressing. The reverse switch is a reset switch and it must be pressed for a long time to achieve the reverse effect, which prevents accidental triggering. The portable drain cleaning machine is equipped with the air switch to improve a safety factor.

Figure 1:
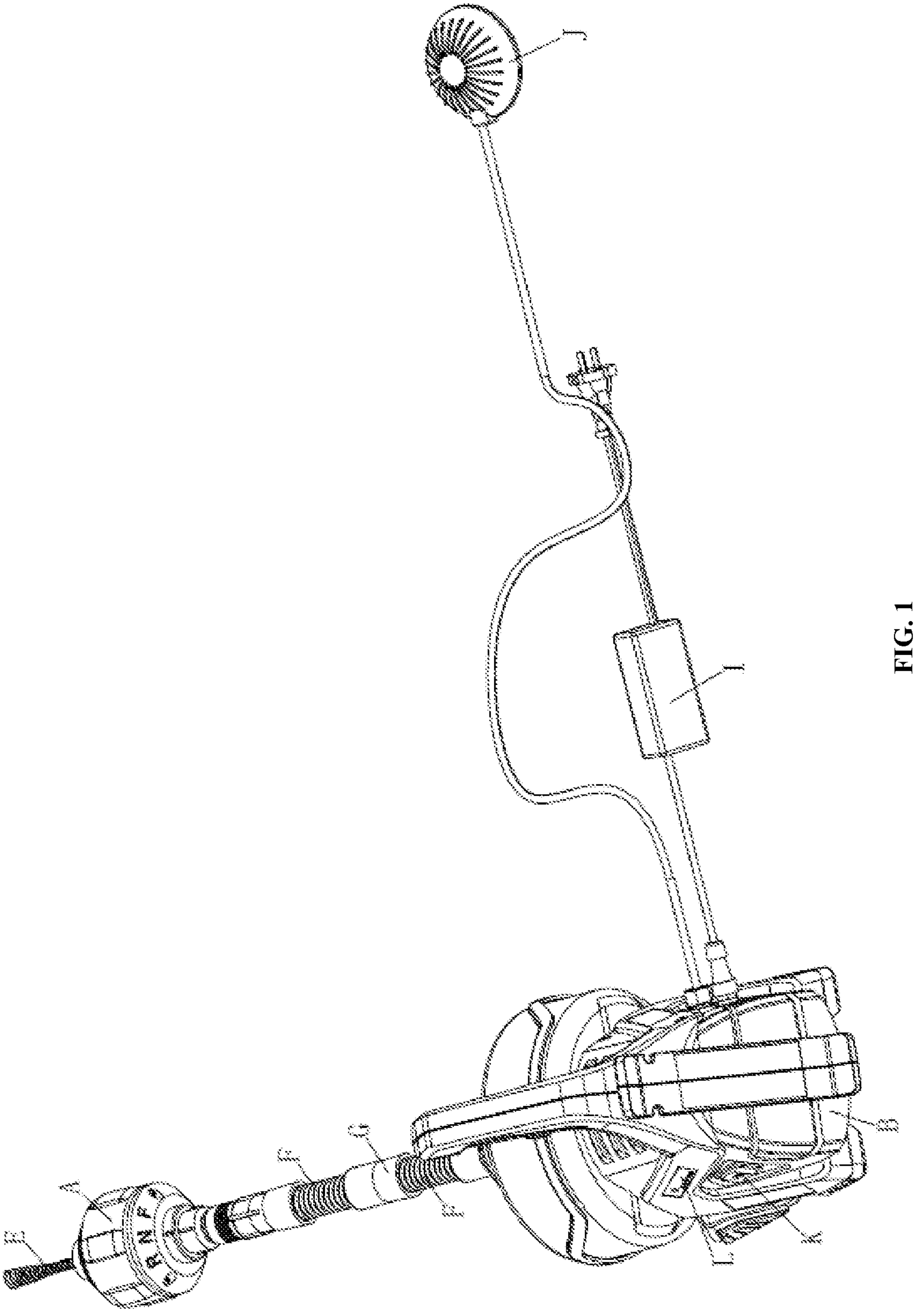
FIG. 1 is a three-dimensional structural diagram of a portable drain cleaning machine according to an embodiment of the present disclosure.

Reference numerals: flexible shaft advancing and retreating device A, casing device B, motor device C, drum device D, flexible shaft E, protection tube F, joint G, battery H, charger I, airbag switch J, rocker switch K, and power display L, handle body A1, handle end cover A2, handle grip A3, advancing and retreating body A4, feed mechanism A5, retraction mechanism A6, and plastic sleeve A7,

- feed rocker arm A51, feed pressure roller A52, feed bearing A53, feed torsion spring A54, feed pin shaft A55, and feed housing A56,
- retraction rocker arm A61, retraction pressure roller A62, retraction bearing A63, retraction torsion spring A64, retraction pin shaft A65, and retraction housing A66,
- left casing B1, right casing B2, cover B3, flexible shaft sleeve B4, motor clamping groove B5, battery compartment B6, rubber pad B7, line clamping plate B8, line clamping groove B9, lifting handle B10, and drum cavity B11,
- motor front clamping groove B51, motor middle clamping groove B52, and motor rear clamping groove B53,
- motor C1, motor fixing plate C2, and motor connecting shaft C3, and
- drum body D1, flexible shaft disc D2, motor connecting plate D3, flexible shaft sleeve D4, and flexible shaft seat D5.

DETAILED DESCRIPTION OF THE EMBODIMENTS

The present disclosure will be further described in detail below in conjunction with the accompanying drawings and through the embodiments. The following embodiments explain the present disclosure, and the present disclosure is not limited to the following embodiments.

Embodiment

Figure 2:
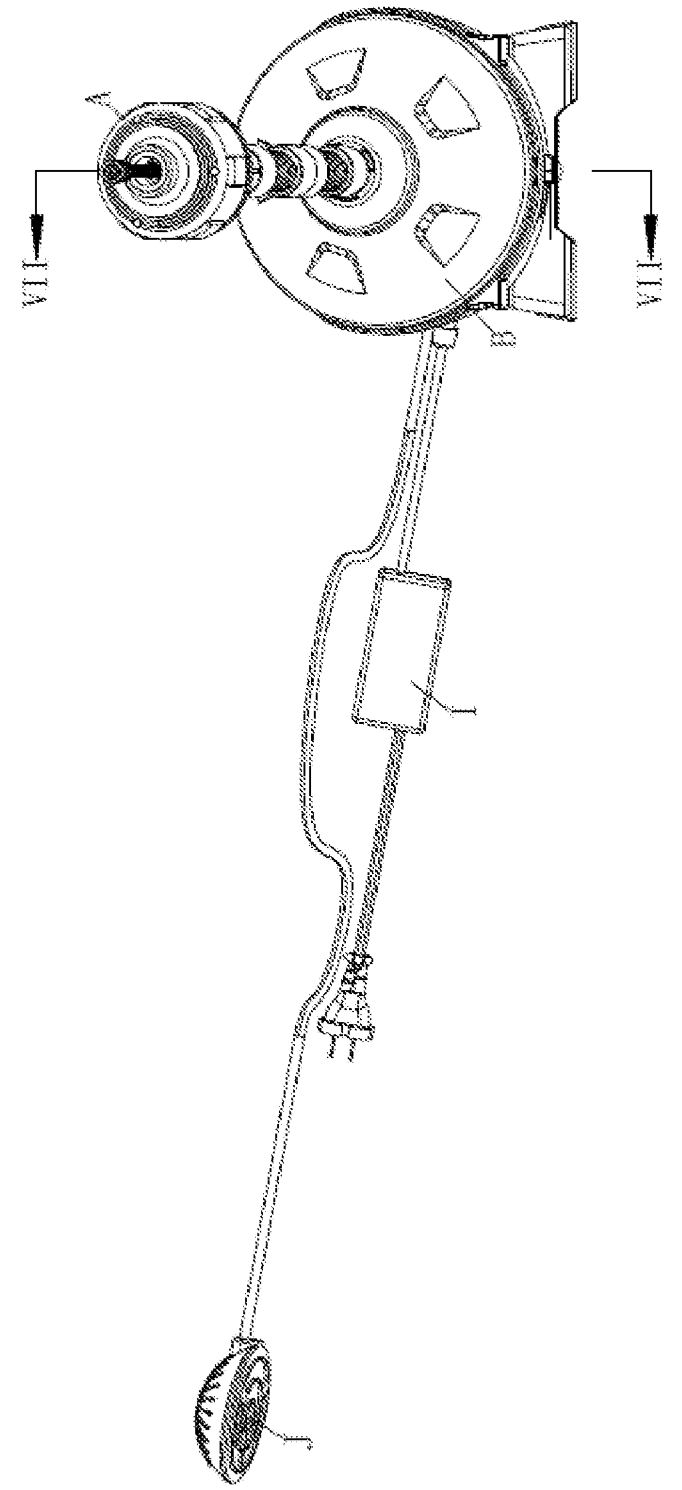
FIG. 2 is a front-view structural diagram of the portable drain cleaning machine according to the embodiment of the present disclosure.
Figure 3:
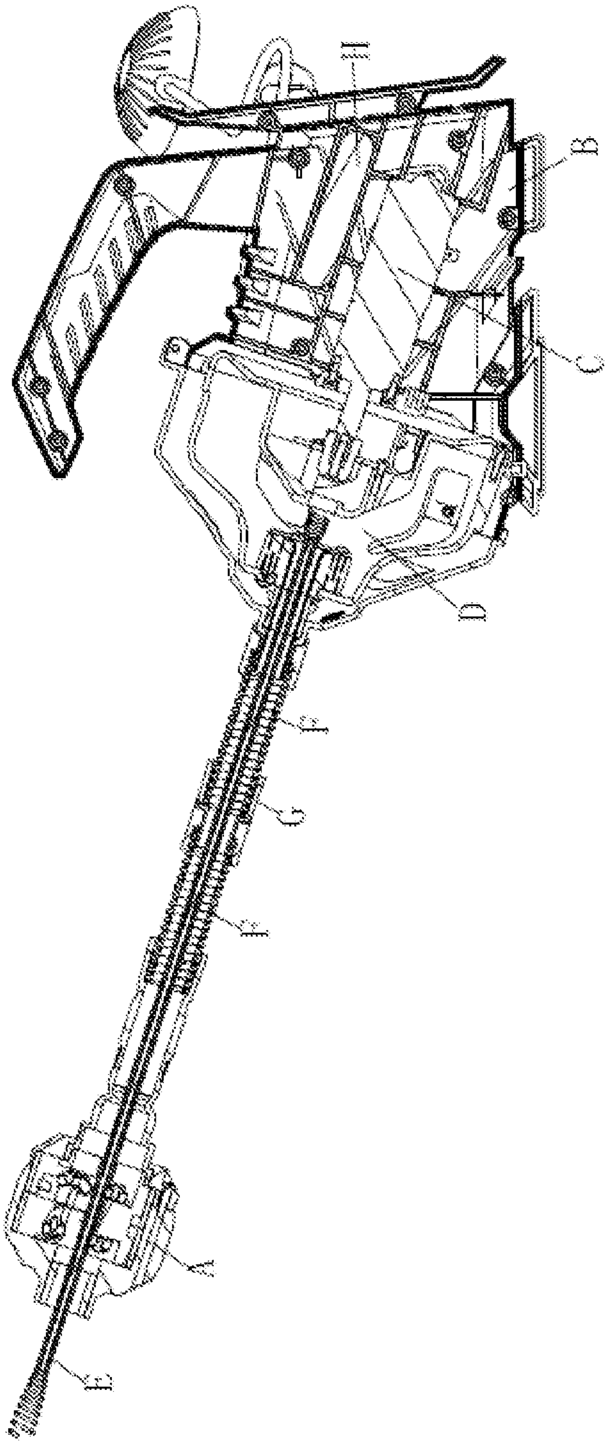
FIG. 3 is a sectional structural diagram of a part VII-VII in FIG. 2.
Figure 4:
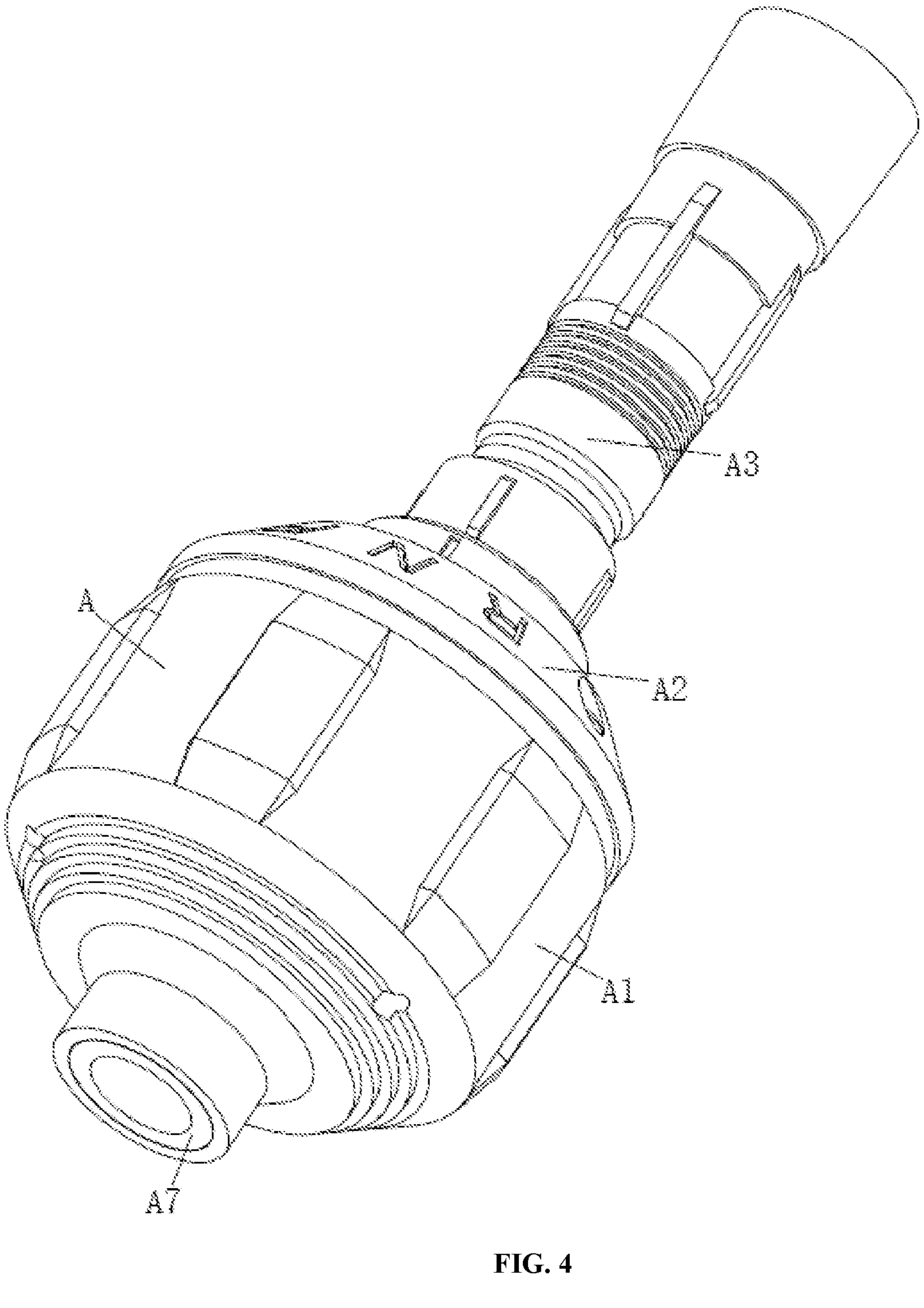
FIG. 4 is a three-dimensional structural diagram of a flexible shaft advancing and retreating device according to the embodiment of the present disclosure.
Figure 5:
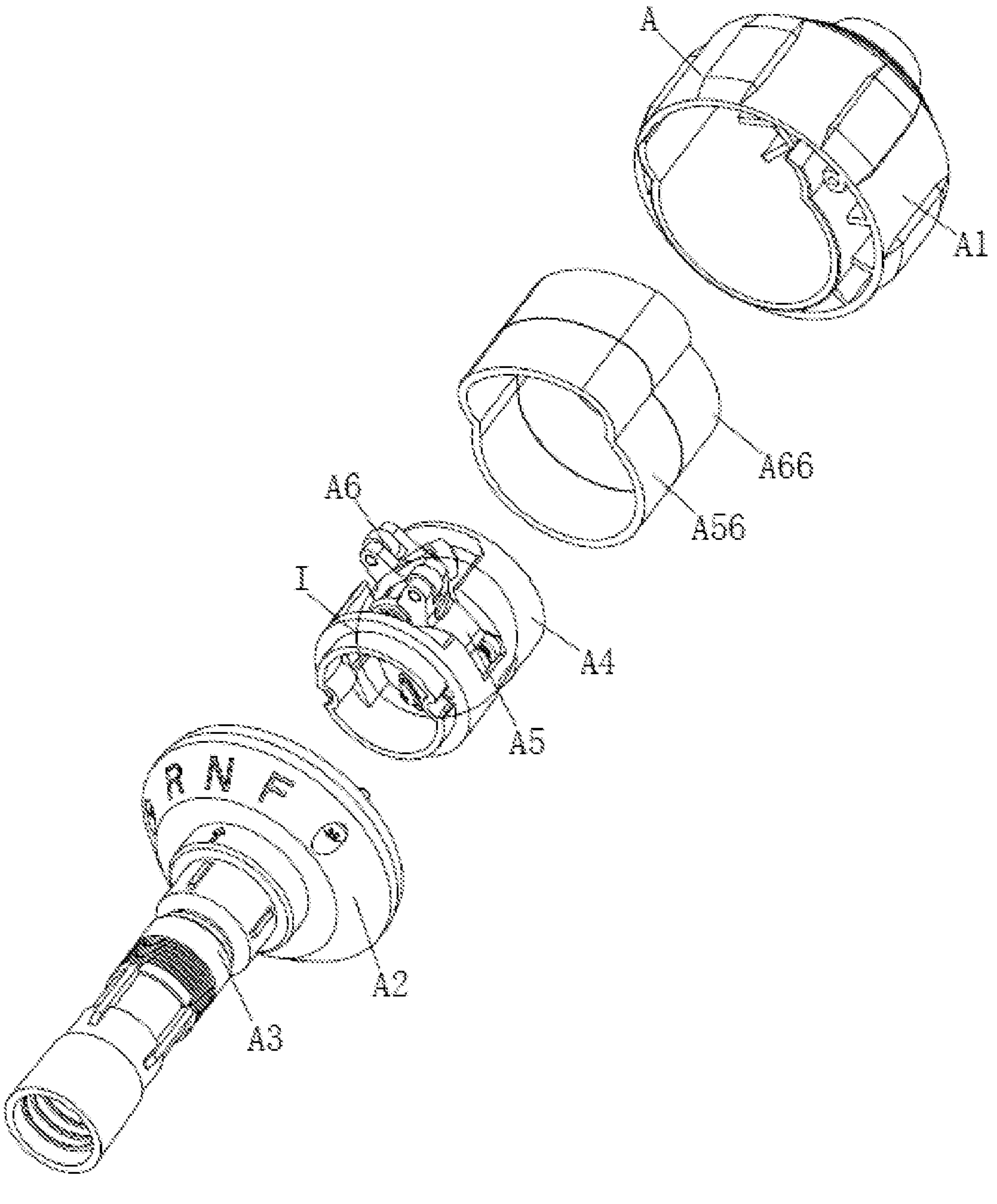
FIG. 5 is an exploded structural diagram of the flexible shaft advancing and retreating device according to the embodiment of the present disclosure.
Figure 6:
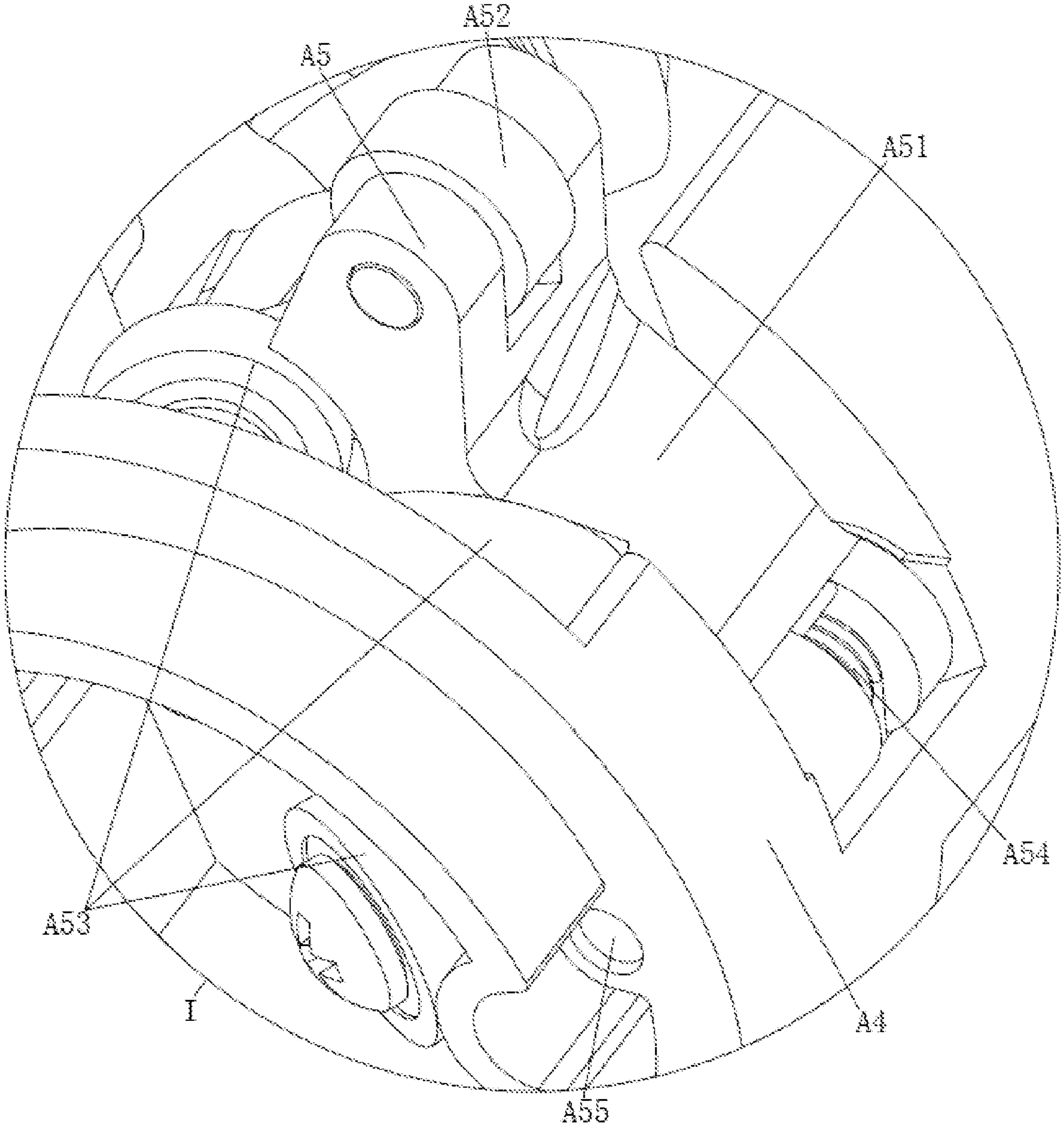
FIG. 6 is an enlarged structural diagram of a part I in FIG. 5.
Figure 7:
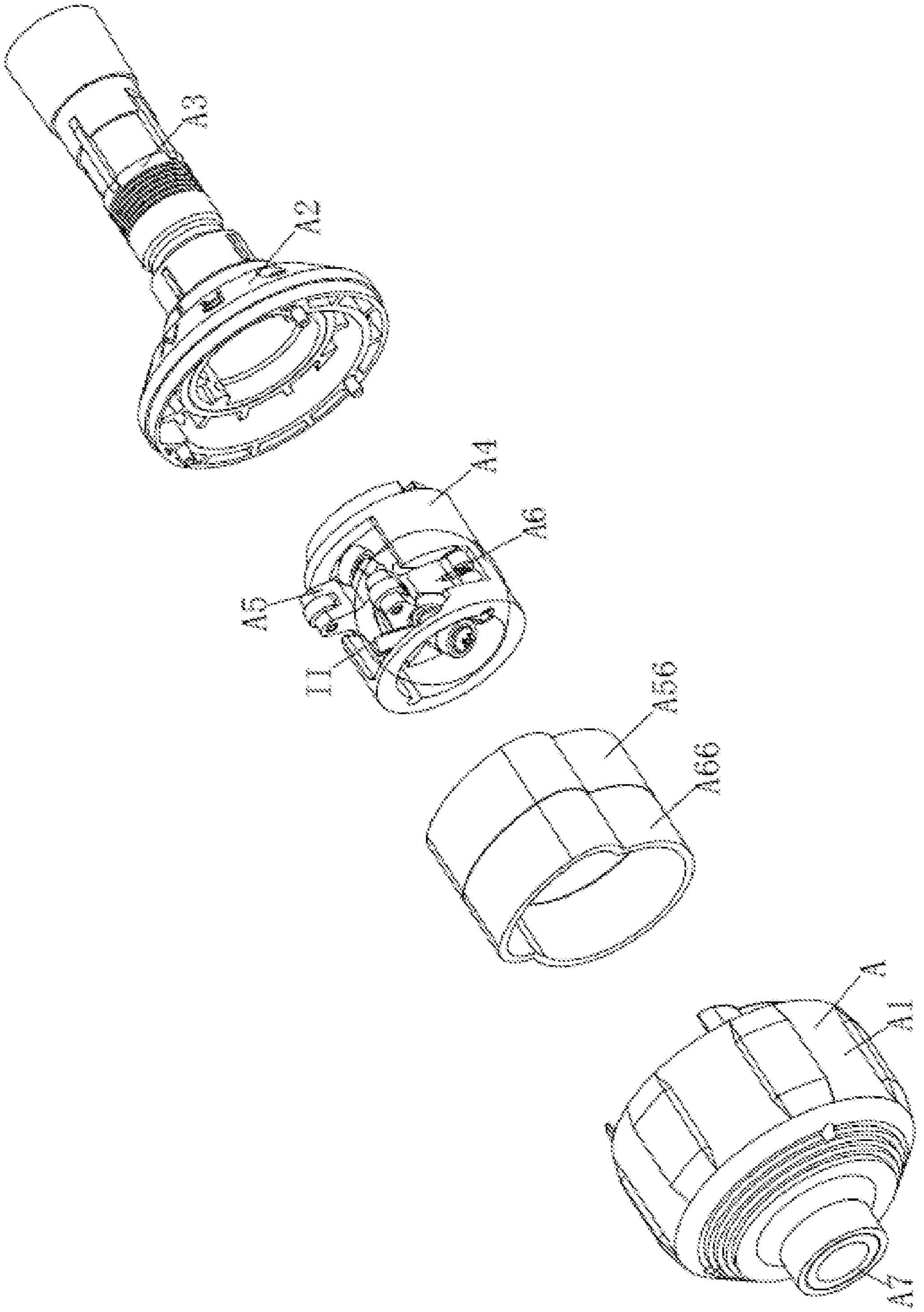
FIG. 7 is an exploded structural diagram of the flexible shaft advancing and retreating device according to the embodiment of the present disclosure.
Figure 8:
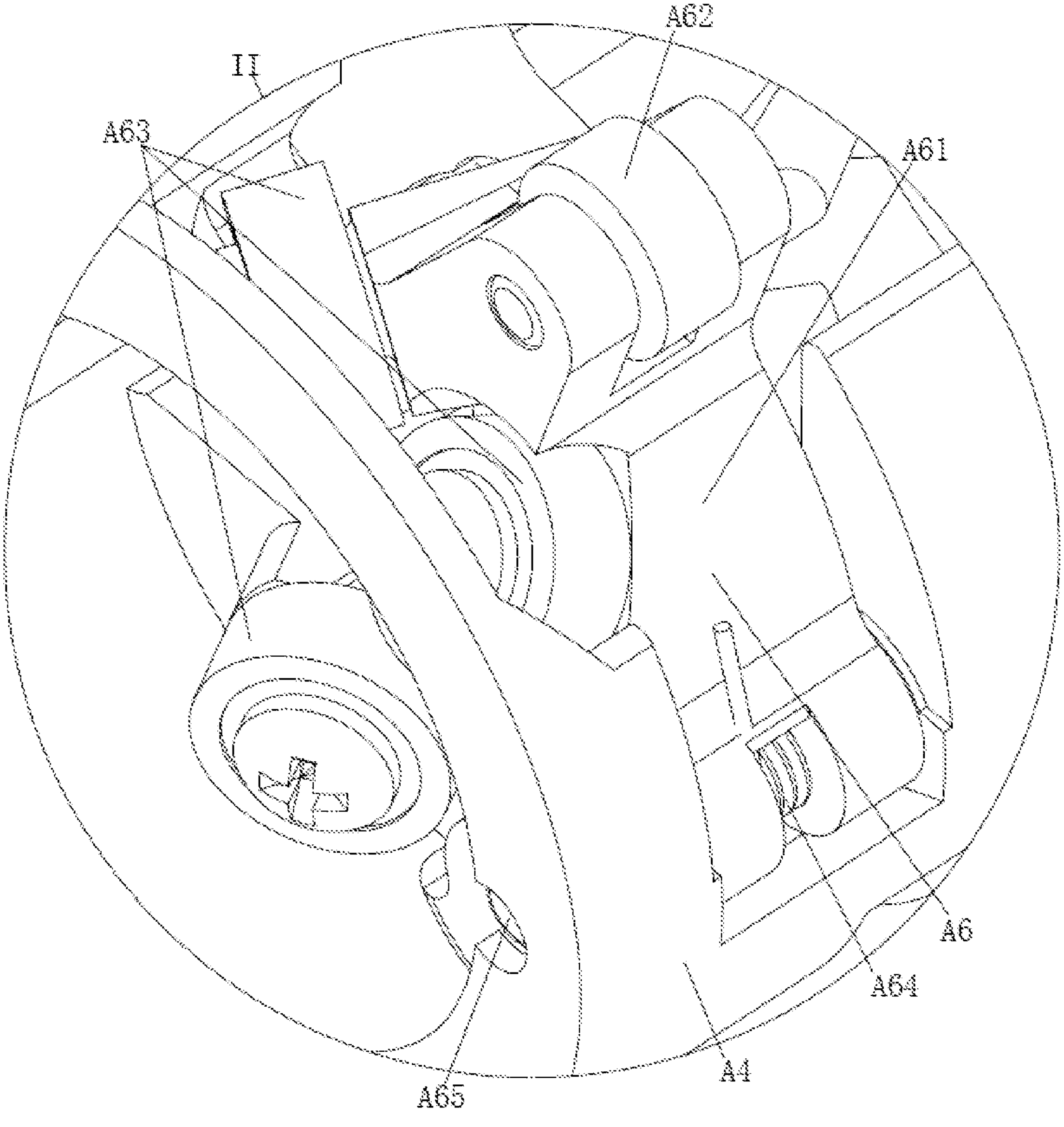
FIG. 8 is an enlarged structural diagram of a part II in FIG. 7.
Figure 9:
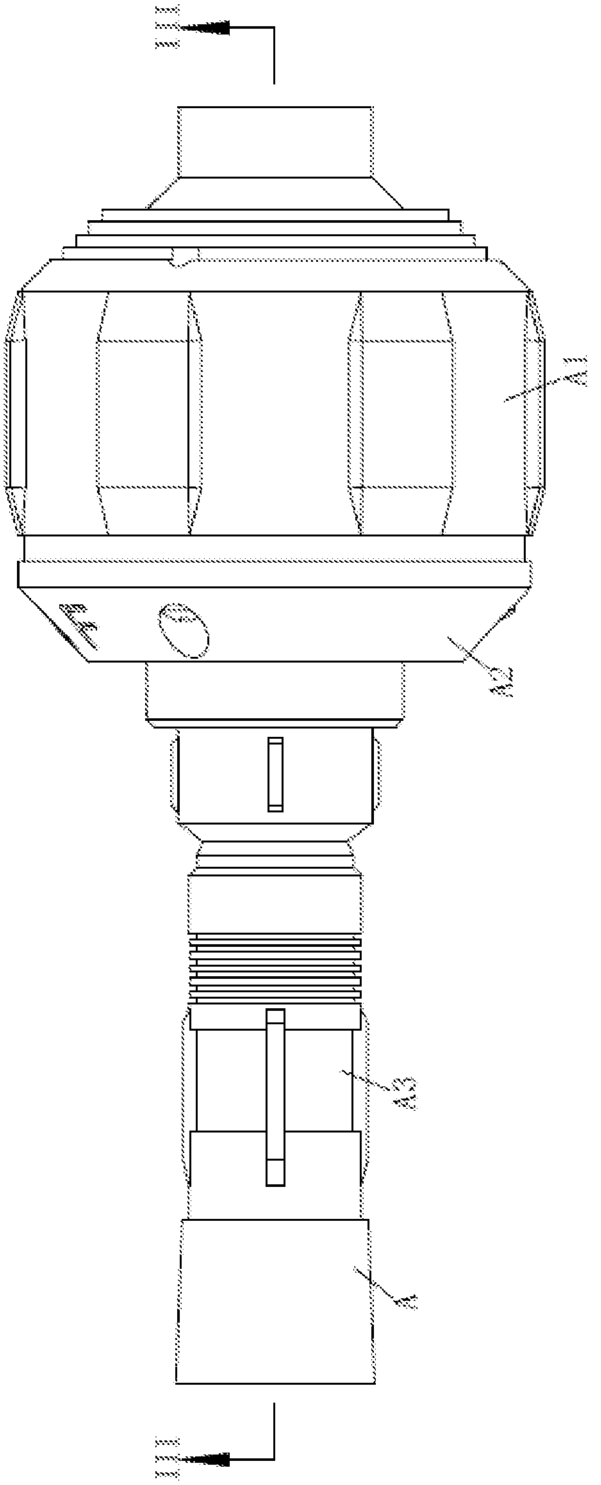
FIG. 9 is a front-view structural diagram of the flexible shaft advancing and retreating device according to the embodiment of the present disclosure.
Figure 10:
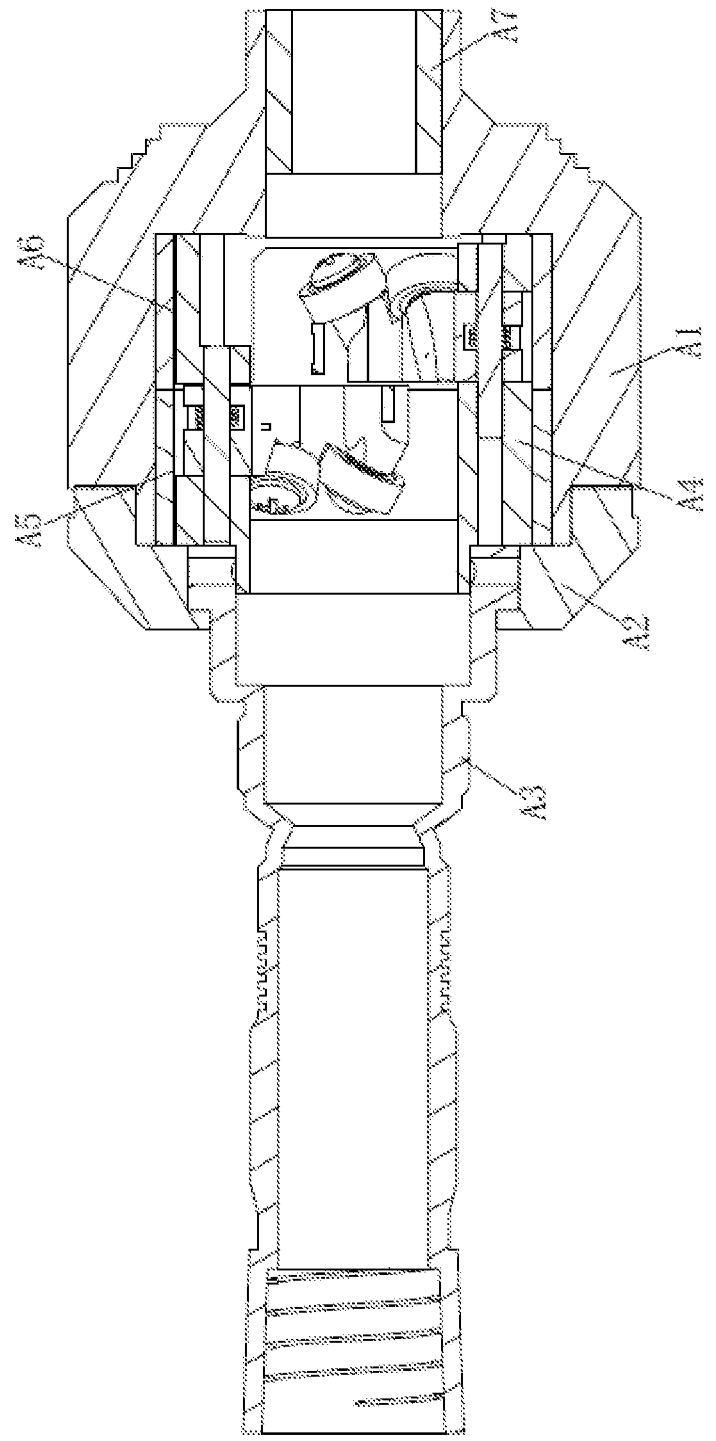
FIG. 10 is a sectional structural diagram of a part in FIG. 9.
Figures 10, 11:
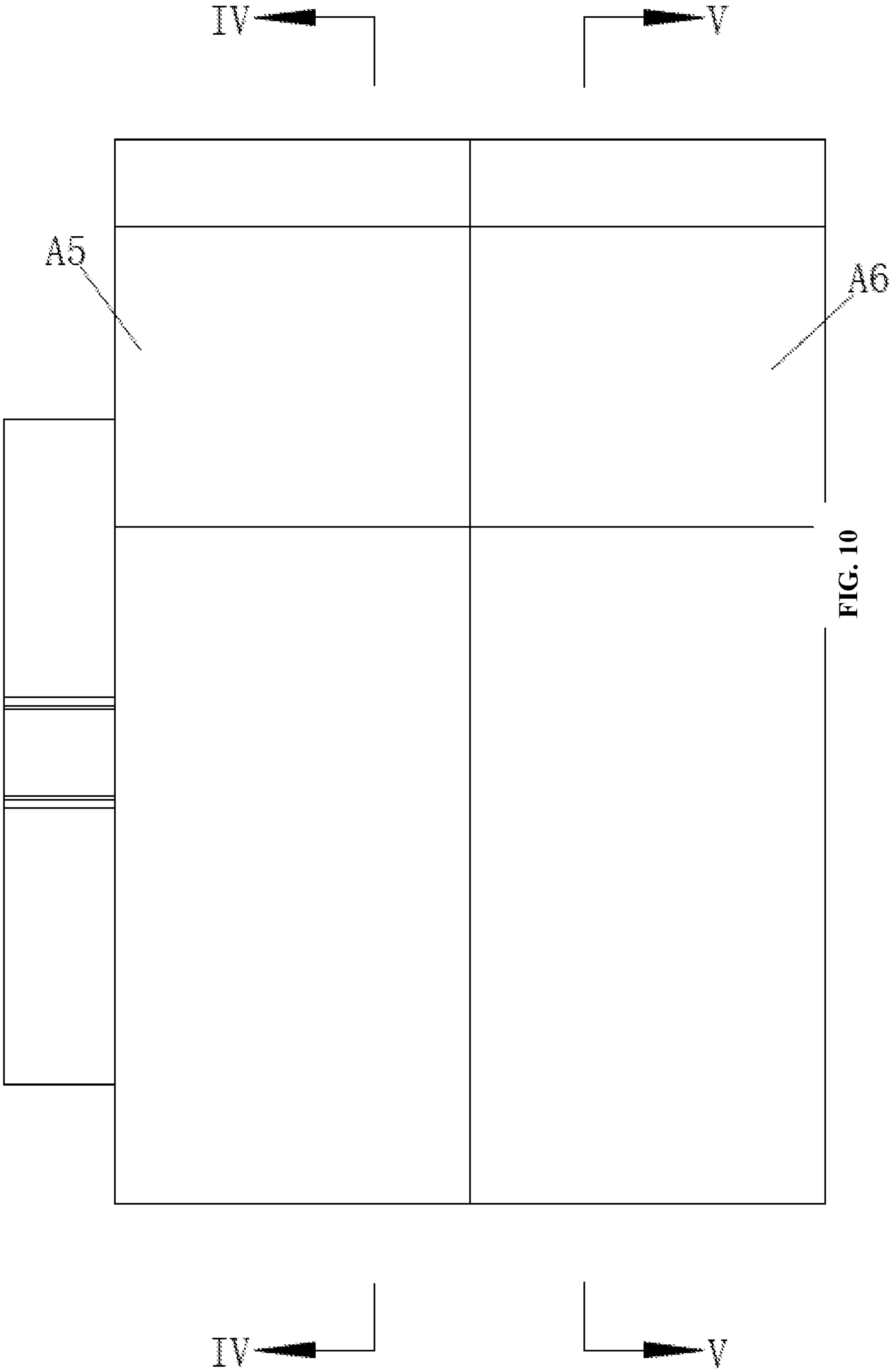
FIG. 11 is a partial structural diagram of the flexible shaft advancing and retreating device according to the embodiment of the present disclosure.
Figure 12:
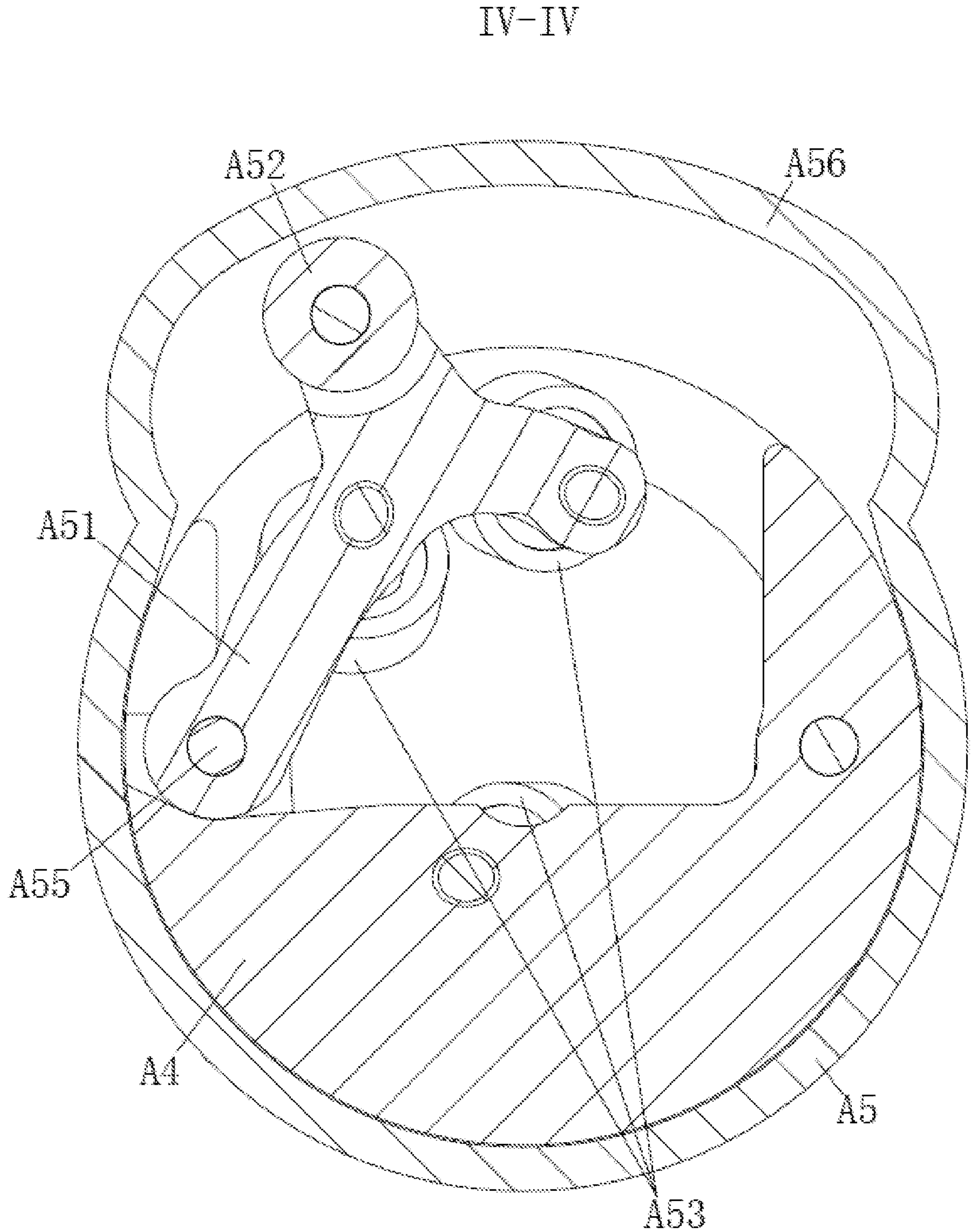
FIG. 12 is a sectional structural diagram of a part IV-IV in FIG. 11.
Figure 13:
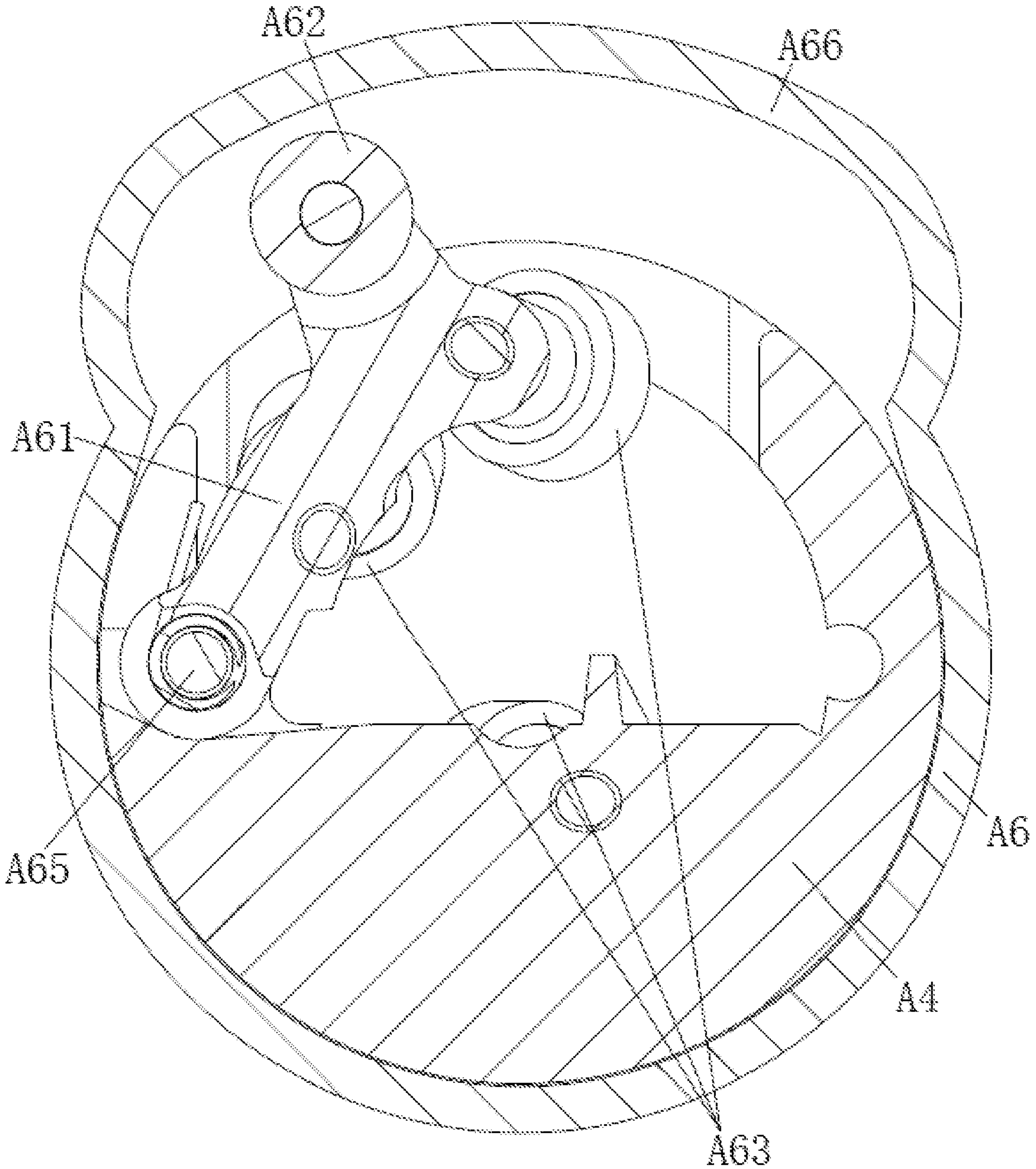
FIG. 13 is a sectional structural diagram of a part V-V in FIG. 11.
Figure 14:
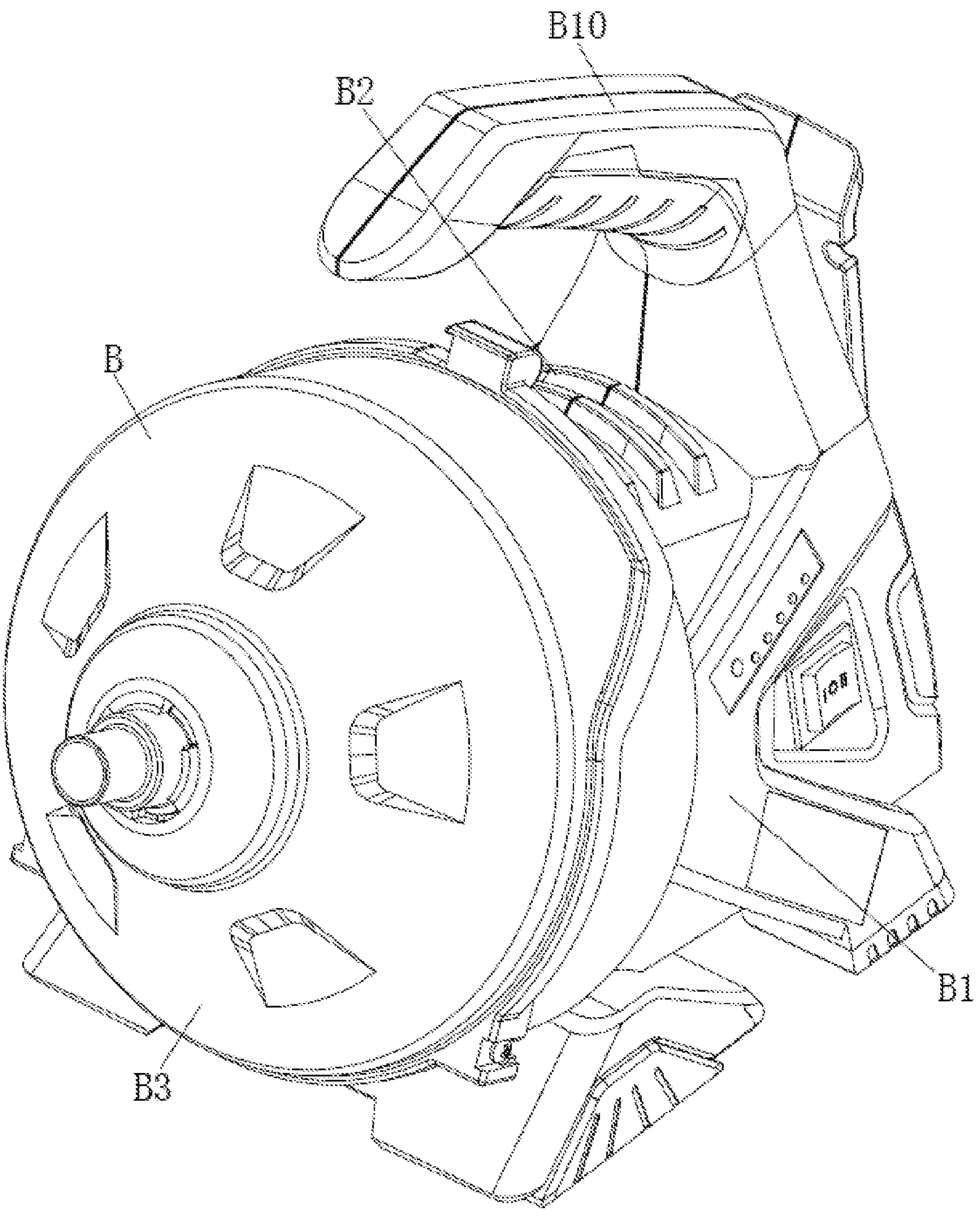
FIG. 14 is a three-dimensional structural diagram of a casing device according to the embodiment of the present disclosure.
Figure 15:
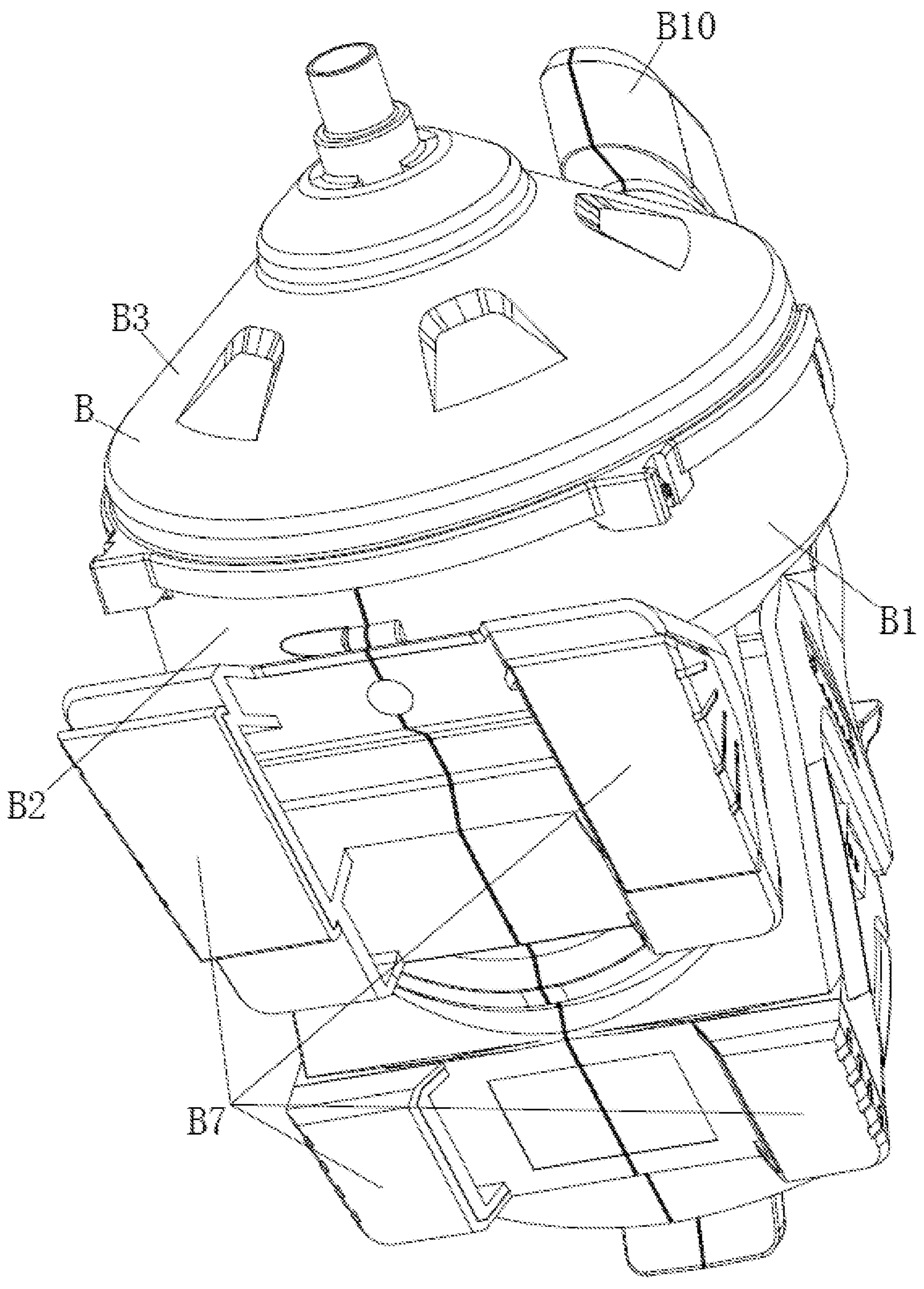
FIG. 15 is a three-dimensional structural diagram of the casing device according to the embodiment of the present disclosure.
Figure 16:
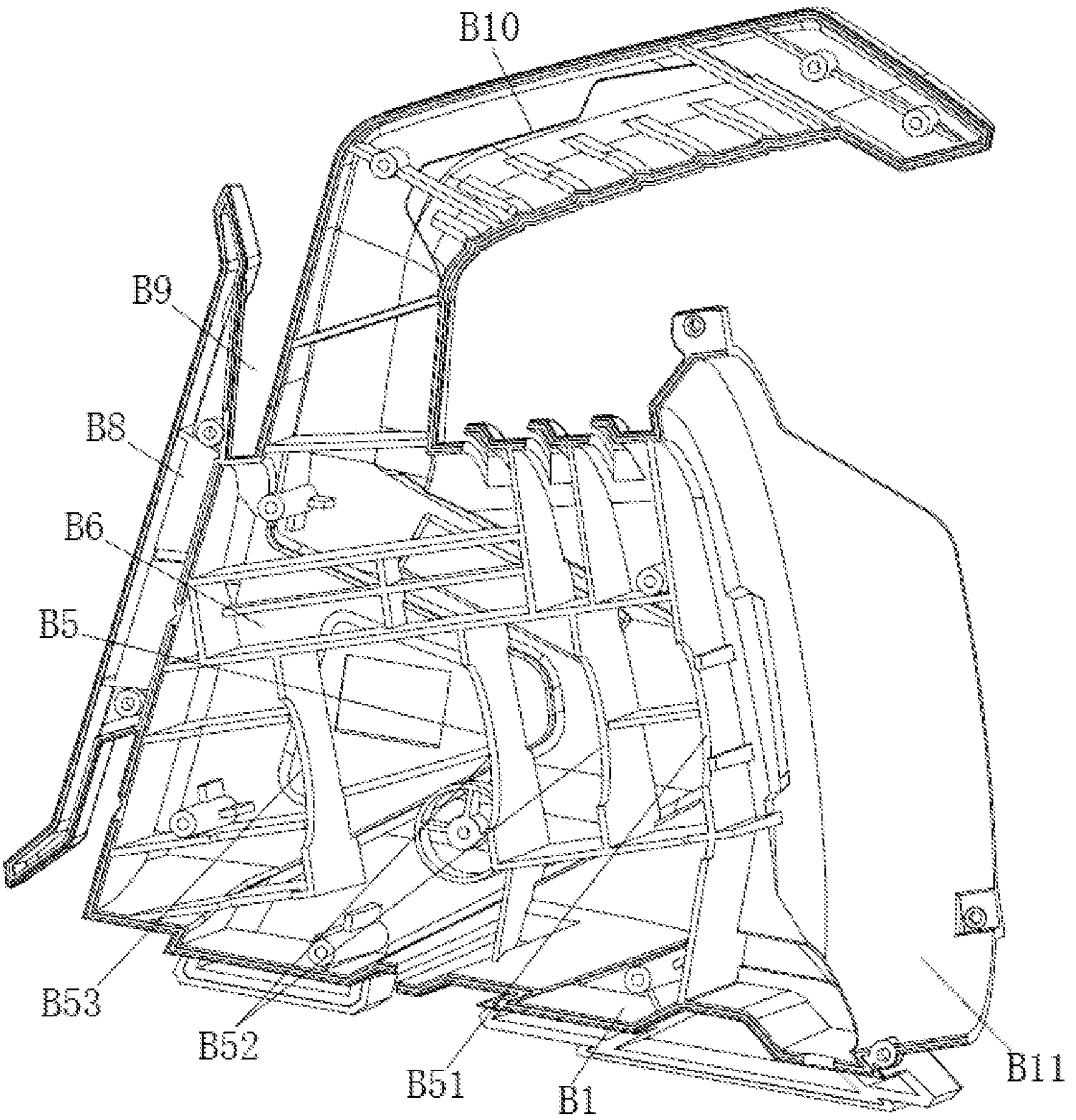
FIG. 16 is a three-dimensional structural diagram of a left casing according to the embodiment of the present disclosure.
Figure 17:
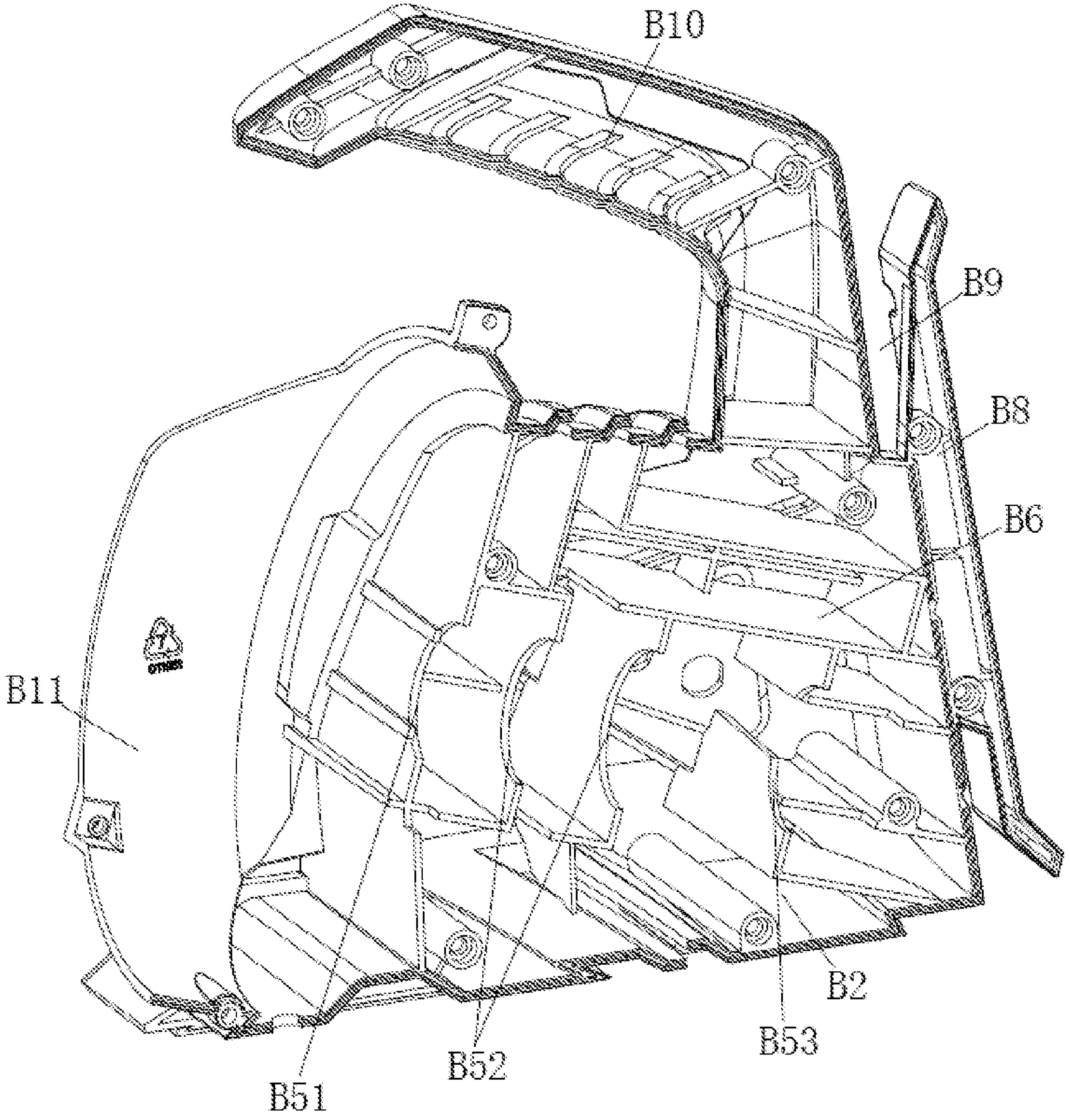
FIG. 17 is a three-dimensional structural diagram of a right casing according to the embodiment of the present disclosure.
Figure 18:
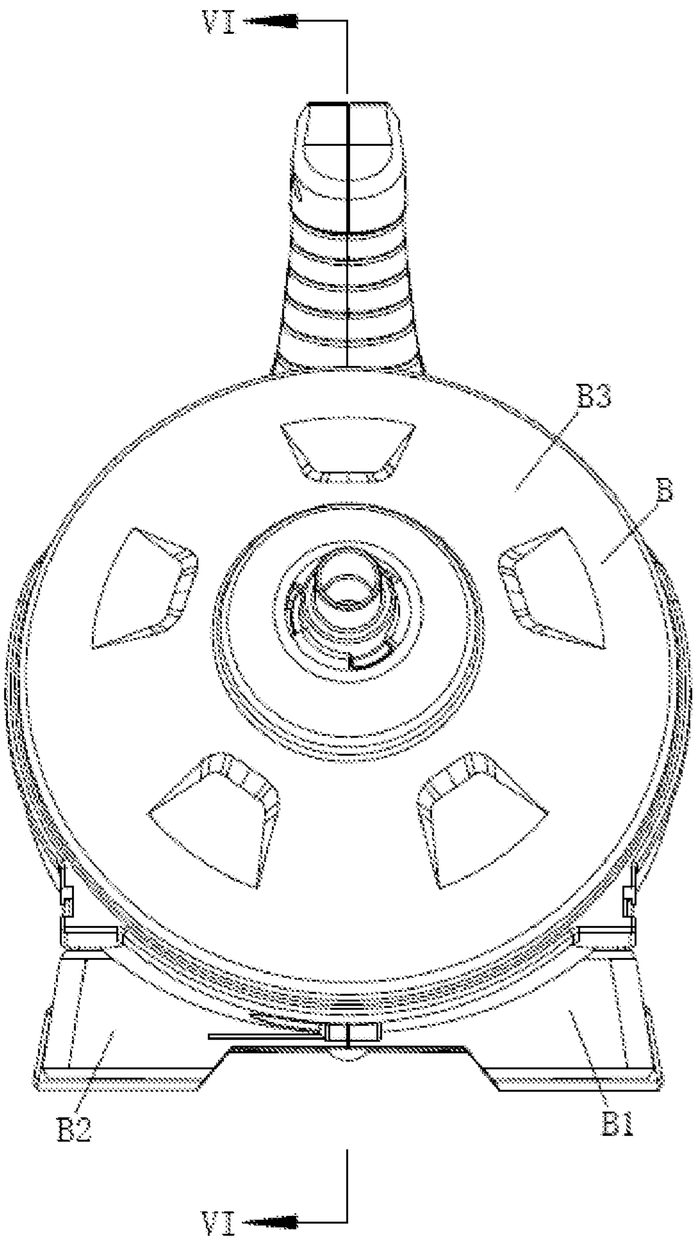
FIG. 18 is a front-view structural diagram of the casing device according to the embodiment of the present disclosure.
Figure 19:
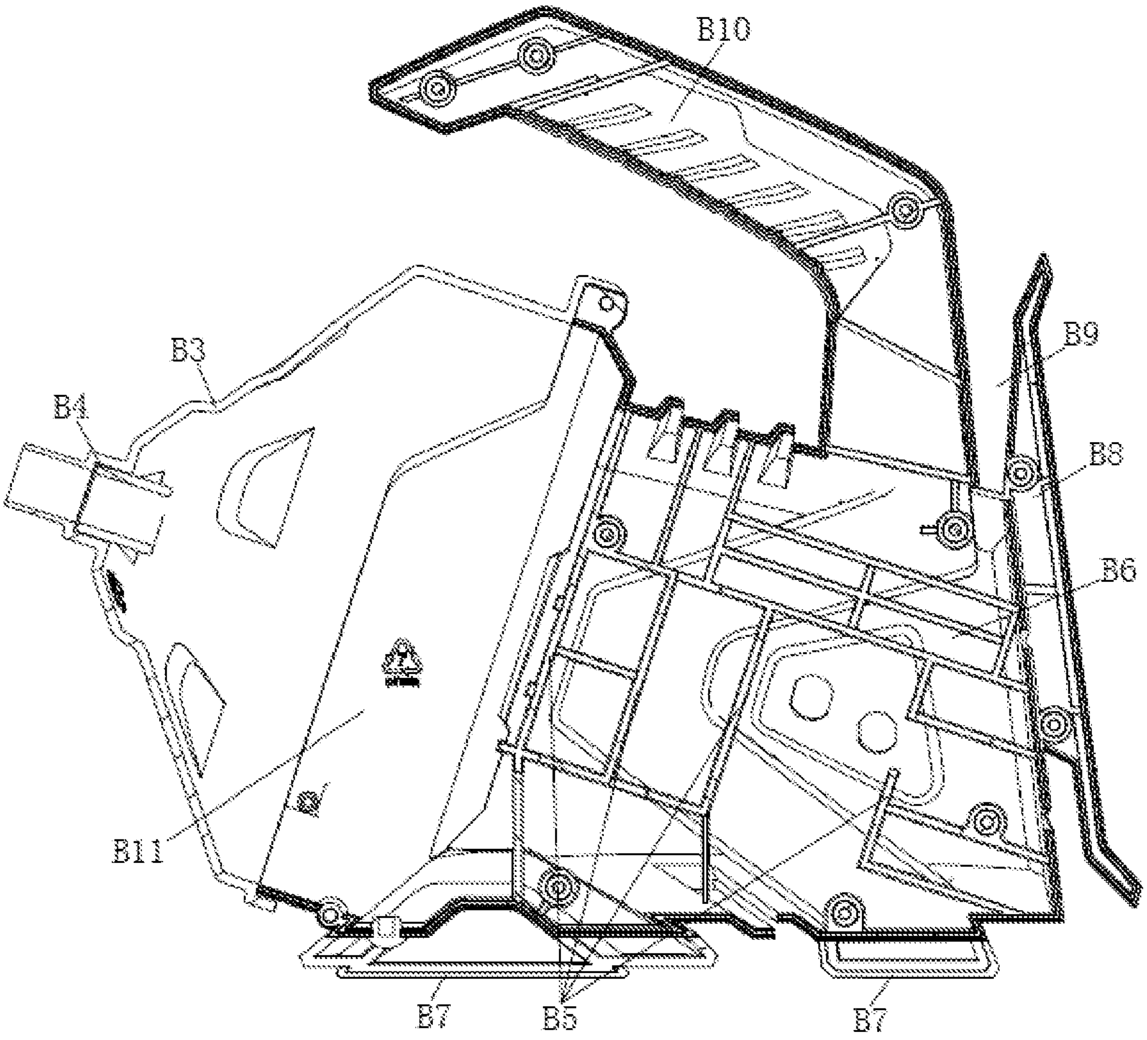
FIG. 19 is a sectional structural diagram of a part VI-VI in FIG. 18.
Figure 20:
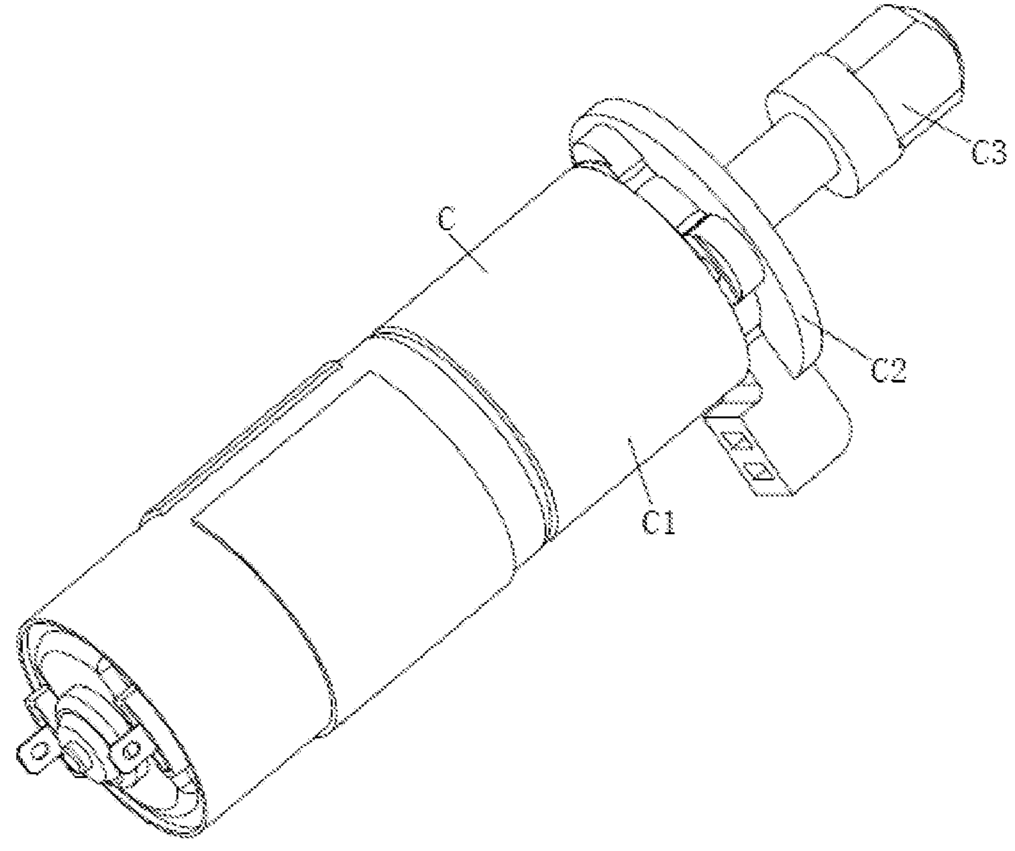
FIG. 20 is a three-dimensional structural diagram of a motor device according to the embodiment of the present disclosure.
Figure 21:
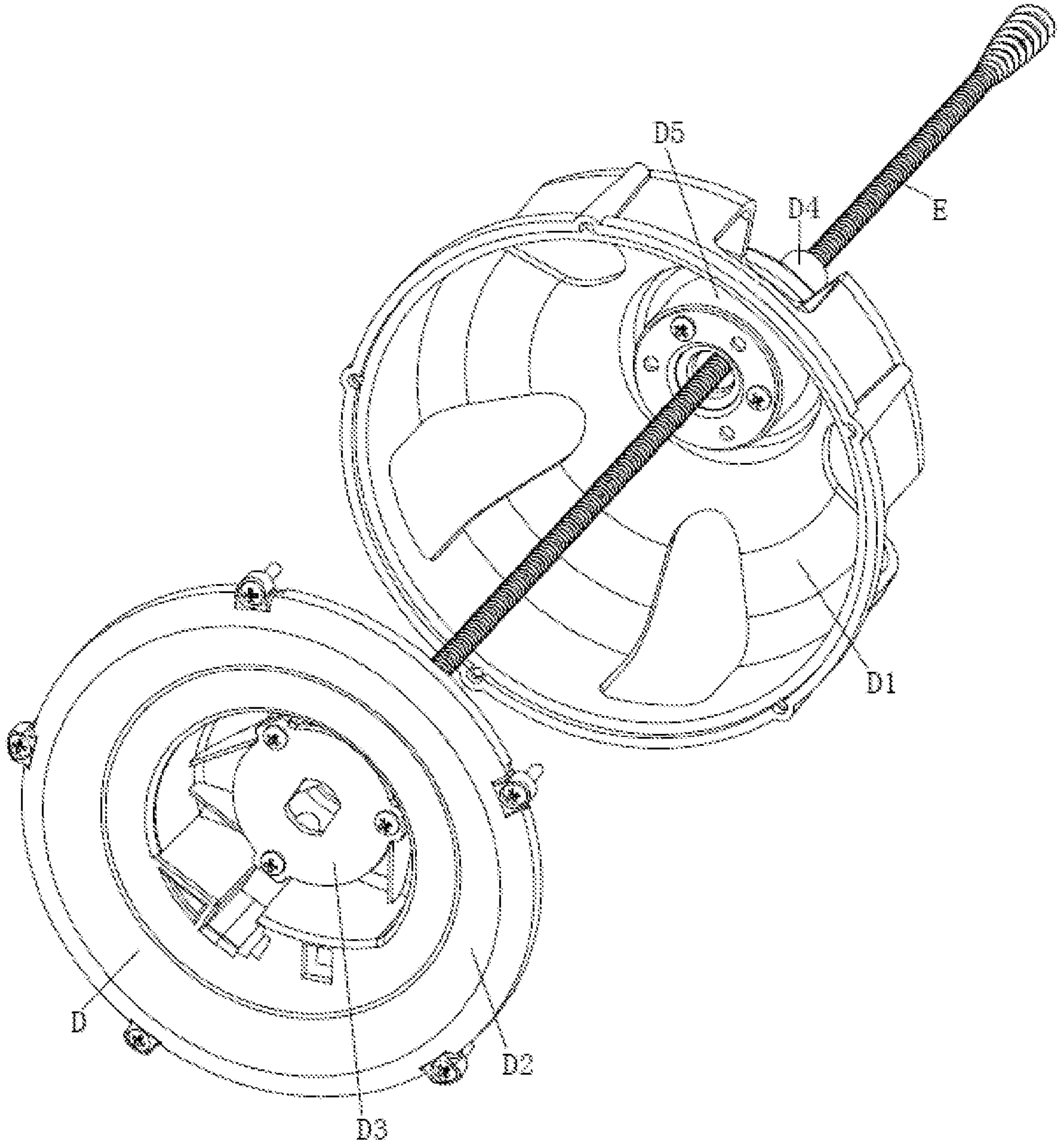
FIG. 21 is an exploded structural diagram of a drum device according to the embodiment of the present disclosure.

With reference to FIG. 1 to FIG. 21, it should be noted that the structure, scale, size, and the like shown in the drawings of this specification are only used to match the content disclosed in the specification and for those skilled in the art to understand and read, which are not used to limit the limitations for implementing the present disclosure and thus are not technically substantial. Any structural modification, scaling relation change, or size adjustment made without affecting the effects and objectives that can be achieved by the present disclosure shall fall within the scope that can be encompassed by the technical content disclosed in the present disclosure. Moreover, the terms such as "upper", "lower," "left" "right", "middle" and "a/an" in this specification are merely employed for ease of description and not intended to limit the scope of the present disclosure. The change or adjustment of the relative relationships shall be deemed as falling within the implementable scope of the present disclosure without substantial alteration of technical contents.

A portable drain cleaning machine in the present embodiment includes a flexible shaft advancing and retreating device A, a casing device B, a motor device C, a drum device D, a flexible shaft E, protection tubes F, a joint G, a battery H, a charger I, an airbag switch J, a rocker switch K, and a power display L. The flexible shaft advancing and retreating device A is connected with the protection tubes F. The protection tubes F are connected with the casing device B. Both the motor device C and the drum device D are arranged in the casing device B. The motor device C cooperates with the drum device D. The flexible shaft E includes one end connected with the drum device D and the other end arranged in a funnel-shaped structure. The flexible shaft E penetrates (e.g. is received within) the flexible shaft advancing and retreating device A and the protection tubes F. Any adjacent two of the protection tubes F are connected by the joint G. The battery H is arranged in the battery compartment B6. Both the rocker switch K and the power display L are arranged on the casing. The battery H, the airbag switch J, and the rocker switch K are connected with a motor C1. The charger I is connected with the battery H. The battery H is connected with the power display L.

The flexible shaft advancing and retreating device A in the present embodiment includes a handle body A1, a handle end cover A2, a handle grip A3, an advancing and retreating body A4, a feed mechanism A5, a retraction mechanism A6, and a plastic sleeve A7. The handle grip A3 cooperates with the advancing and retreating body A4. The handle grip A3 is provided with a limiting convex piece. The advancing and retreating body A4 is provided with a limiting groove. The limiting convex piece is located in the limiting groove. The handle body A1 is provided with an anti-slip convex edge.

The advancing and retreating body A4 in the present embodiment cooperates with the feed mechanism A5 and the retraction mechanism A6. The advancing and retreating body A4 is rotatable relative to a feed housing A56 and a retraction housing A66. Both the feed mechanism A5 and the retraction mechanism A6 are arranged in the handle body A1, the handle grip A3 penetrates (e.g. is received within) the handle end cover A2, the handle end cover A2 is arranged on the handle body A1, and the plastic sleeve A7 is arranged on the handle body A1.

The feed mechanism A5 in the present embodiment includes a feed rocker arm A51, a feed pressure roller A52, three feed bearings A53, a feed torsion spring A54, a feed pin shaft A55, and a feed housing A56. The feed rocker arm A51 is arranged on the advancing and retreating body A4 through the feed pin shaft A55. The feed torsion spring A54 is sleeved on (e.g. receives) the feed pin shaft A55. The feed rocker arm A51 is provided with the feed pressure roller A52 and the feed bearings A53. The feed housing A56 is sleeved on (e.g. receives) the advancing and retreating body A4. The feed housing A56 is arranged in the handle body A1.

The feed torsion spring A54 in the present embodiment includes one end abutting against the advancing and retreating body A4 and the other end abutting against the feed rocker arm A51. The feed pressure roller A52 is in contact with the feed housing A56. The feed bearings A53 are arranged obliquely. The three feed bearings A53 form a flexible shaft feed channel. Two of the feed bearings A53 are arranged on the feed rocker arm A51, and the other feed bearing A53 is arranged on the advancing and retreating body A4.

The retraction mechanism A6 in the present embodiment includes a retraction rocker arm A61, a retraction pressure roller A62, a retraction bearing A63, a retraction torsion spring A64, a retraction pin shaft A65, and a retraction housing A66. The retraction rocker arm A61 is arranged on the advancing and retreating body A4 through the retraction pin shaft A65. The retraction torsion spring A64 is sleeved on (e.g. receives) the retraction pin shaft A65. The retraction rocker arm A61 is provided with the retraction pressure roller A62 and the retraction bearing A63. The retraction housing A66 is sleeved on (e.g. receives) the advancing and retreating body A4. The retraction housing A66 is arranged in the handle body A1.

The retraction torsion spring A64 in the present embodiment includes one end abutting against the advancing and retreating body A4 and the other end abutting against the retraction rocker arm A61. The retraction pressure roller A62 is in contact with the retraction housing A66. The retraction bearing A63 is arranged obliquely. Three retraction bearings A63 are arranged. The three retraction bearings A63 form a flexible shaft retraction channel. Two of the retraction bearings A63 are arranged on the retraction rocker arm A61, and the other retraction bearing A63 is arranged on the advancing and retreating body A4.

The casing device B in the present embodiment includes a casing, a cover B3, a flexible shaft sleeve B4, a motor clamping groove B5, a battery compartment B6, and a rubber pad B7. The cover B3 is arranged on the casing. The flexible shaft sleeve B4 is arranged on the cover B3. Both the motor clamping groove B5 and the battery compartment B6 are arranged in the casing. The rubber pad B7 is arranged at a bottom of the casing.

The casing in the present embodiment is arranged obliquely. The casing includes a left casing B1 and a right casing B2. The cover B3 is arranged on the left casing B1 and the right casing B2. The motor clamping groove B5 is located below the battery compartment B6.

The casing in the present embodiment is provided with a lifting handle B10 at a top and a line clamping plate B8 at a rear. A line clamping groove B9 is arranged between the line clamping plate B8 and the casing. The line clamping plate B8 is arranged in a T-shaped structure. A drum cavity B11 configured to place the drum is arranged between the cover B3 and the casing.

The motor clamping groove B5 in the present embodiment includes a motor front clamping groove B51, a motor middle clamping groove B52, and a motor rear clamping groove B53. The motor front clamping groove B51, the motor middle clamping groove B52, and the motor rear clamping groove B53 are arranged in sequence from front to back.

The number of the motor front clamping groove B51, the motor middle clamping groove B52, and the motor rear clamping groove B53 in the present embodiment is two. The two motor front clamping grooves B51, motor middle clamping grooves B52, and motor rear clamping grooves B53 are respectively arranged on the left casing B1 and the right casing B2.

The motor device C in the present embodiment includes a motor C1, a motor fixing plate C2, and a motor connecting shaft C3. The motor fixing plate C2 is arranged on the casing device B. The motor C1 is arranged on the motor fixing plate C2. The motor connecting shaft C3 is arranged on an output shaft of the motor C1. The motor connecting shaft C3 is connected with the drum device D. The motor C1 is located in a motor clamping groove B5.

The drum device D in the present embodiment includes a drum body D1, a flexible shaft disc D2, a motor connecting plate D3, a flexible shaft sleeve D4, and a flexible shaft seat D5. The flexible shaft disc D2 is arranged on the drum body D1. The motor connecting plate D3 is arranged on the flexible shaft disc D2. The motor connecting plate D3 is connected with the motor connecting shaft C3. One end of the flexible shaft E is connected with the flexible shaft disc D2. The flexible shaft seat D5 is arranged on the drum body D1. The flexible shaft sleeve D4 is arranged on the flexible shaft seat D5. The flexible shaft sleeve D4 is sleeved outside (e.g. receives) the flexible shaft E.

A drain cleaning method of a portable drain cleaning machine in the present embodiment includes the following steps.

A handle body A1 is rotated counterclockwise to make a feed housing A56 contact a feed pressure roller A52 to move a feed rocker arm A51 downward. A flexible shaft E is locked by three feed bearings A53. A flexible shaft disc D2 is driven by a motor C1 to rotate in a forward direction. The flexible shaft E is driven by the feed bearings A53 to rotate forward, so as to realize a feed function of the flexible shaft E. During reset, the feed rocker arm A51 is capable of being reset upward through a feed torsion spring A54.

The handle body A1 is rotated clockwise to make a retraction housing A66 contact a retraction pressure roller A62 to move a retraction rocker arm A61 downward. The flexible shaft E is locked by a retraction bearing A63. The flexible shaft disc D2 is driven by the motor C1 to rotate in a forward direction. The flexible shaft E is driven by the retraction bearing A63 to rotate rearward, so as to realize a retraction function of the flexible shaft E. During reset, the retraction rocker arm A61 is capable of being reset upward through a retraction torsion spring A64.

Specifically, the flexible shaft advancing and retreating device A is connected with the casing device B through the protection tubes F and the joint G. The protection tubes F can prevent the splash of pollutants and prevent the flexible shaft E from being wounded and hurting people.

The flexible shaft advancing and retreating device A adopts a self-locking structure. When the self-locking structure is locked to the right, the machine may rotate forward to realize the automatic feed function and the rotating forward function of the flexible shaft, which achieves excellent drain cleaning effect. When the self-locking structure is locked to the left, the machine may reverse to realize the automatic retraction function.

The automatic feed principle is as follows. Looking from the handle grip A3 to the handle body A1, the handle body A1 is rotated counterclockwise to a locking position, the feed housing A56 also rotates with the handle body A1, and the inside of the feed housing A56 squeezes the feed pressure roller A52 to move the feed rocker arm A51 downward to the locking position. The feed bearings A53 follow the feed rocker arm A51 down to the locking position to lock the flexible shaft. At this time, the motor rotates forward to drive the flexible shaft barrel assembly to rotate. Due to the friction between the feed bearings A53 and the flexible shaft, the installation direction of the feed bearings A53 used for the feed drives the flexible shaft to move forward relative to the rotation direction, and the flexible shaft rotates forward. During reset, the feed rocker arm A51 can be reset through the feed torsion spring A54.

The automatic retraction principle is as follows. Looking from the handle grip A3 to the handle body A1, the handle body A1 is rotated clockwise to a locking position, the retraction housing A66 also rotates with the handle body A1, and the inside of the retraction housing A66 squeezes the retraction pressure roller A62 to move the retraction rocker arm A61 downward to the locking position. The retraction bearing A63 follows the retraction rocker arm A61 down to the locking position to lock the flexible shaft. At this time, the motor rotates forward to drive the flexible shaft barrel assembly to rotate. Due to the friction between the retraction bearing A63 and the flexible shaft, the installation direction of the retraction bearing A63 used for the retraction drives the flexible shaft to move rearward relative to the rotation direction, and the flexible shaft rotates rearward. During reset, the retraction rocker arm A61 can be reset through the retraction torsion spring A64.

The flexible shaft E adopts an ultra-soft steel wire rope mandrel to strengthen the strength of the flexible shaft and prevent fracture of the flexible shaft E in the drain cleaning process. The other end of the flexible shaft E adopts a specially designed funnel-shaped cutter head, which has excellent drain cleaning effect and strong bending ability. In particular, this special design can smoothly pass through an inspection port structure of a 50 mm water return bend.

The working principle of the flexible shaft passing through the inspection port of the drainage bend is described as follows. The size of the front part of the funnel-shaped cutter head is slightly larger than the height of the inspection port step, and the head wire hooks the upper part of the step to cooperate with the rotation to realize the effect of climbing the step, such that the flexible shaft passes through the inspection port of the drainage bend.

The protection tubes F are connected with the casing device B by a tail rubber head, and any adjacent two of the protection tubes F are connected by the joint G, which can lengthen the protection tube. The protection tubes F and the flexible shaft advancing and retreating device A are in threaded rotary connection by a threaded head.

The motor C1 and a gearbox are combined into a whole by screw fixation, and a motor gearbox complex is limited by the motor clamping groove B5 in front and rear directions and left and right rotation directions. The limit position in the rotation direction is close to a load position, the limit effect is excellent, and the impact is small. With the rubber pad B7 at the bottom of the casing, the whole machine starts and runs more smoothly.

The motor front clamping groove B51 and the motor rear clamping groove B53 are inside the casing clamp front and rear positions of the motor. The motor middle clamping groove B52 holds the outer circle of the motor. The position of a rotation limit piece limits the rotation of the motor and cooperates with the rubber pad B7 at the bottom of the casing for buffering, so as to achieve stable start and operation.

The line clamping plate B8 and the line clamping groove B9 positioned at the rear of the casing are convenient for storage and carrying. The transparent cover B3 at the front of the drum is inserted on the left casing B1 and the right casing B2 with copper nuts for installation, which is convenient for disassembly and assembly, and it will not be damaged after repeated disassembly and assembly.

The battery compartment B6 configured to place a lithium battery is arranged inside the casing, and is equipped with a lithium battery and a corresponding motor. When the lithium battery is used for driving, the safety performance is excellent and the portability is strong. The battery H is a lithium battery.

The airbag switch J is used to cut off a main circuit, which can be suspended at any time in case of wrong operation. At the same time, the airbag switch J is pneumatically controlled, which has excellent safety performance. The rocker switch K adopts a switch which can be automatically reset in reverse. When the forward gear is pressed down, the switch is normally turned on. The reverse gear must be pressed for a long time to turn on, and when released, the switch is automatically disengaged to prevent accidental trigger.

In addition, it should be noted that the specific embodiments described in this specification may parts and components that have different shapes and names. The above content described in this specification is only an illustration of the structure of the present disclosure. All equivalent changes or simple changes made according to the structure, features and principles described in the patent concept of the present disclosure are included in the protection scope of the patent of the present disclosure. Various modifications or supplementations of the specific examples described or substitutions in a similar manner made by those skilled in the art without departing from the concept of the present disclosure or going beyond the scope as defined in the appended claims should fall within the protection scope of the present disclosure.

What is claimed is:

1. A portable drain cleaning machine, comprising: a flexible shaft advancing and retreating device, a casing device, a motor device, a drum device, a flexible shaft, protection tubes, and a joint; wherein the flexible shaft advancing and retreating device is connected with the protection tubes; the protection tubes are connected with the casing device; the motor device and the drum device are arranged in the casing device; the motor device cooperates with the drum device, the flexible shaft comprises a first end connected with the drum device and a second end arranged in a funnel-shaped structure; the flexible shaft penetrates the flexible shaft advancing and retreating device and the protection tubes; any adjacent two of the protection tubes are connected by the joint;

the drum device comprises a drum body, a flexible shaft disc, and a motor connecting plate; the flexible shaft disc is arranged on the drum body; the motor connecting plate is arranged on the flexible shaft disc; the motor connecting plate is connected with the motor device; and the first end of the flexible shaft is connected with the flexible shaft disc.

2. The portable drain cleaning machine according to claim 1, wherein the flexible shaft advancing and retreating device comprises a handle body, a handle end cover, a handle grip, an advancing and retreating body, a feed mechanism, a retraction mechanism, and a plastic sleeve;

the handle grip cooperates with the advancing and retreating body; the advancing and retreating body cooperates with the feed mechanism and the retraction mechanism; the feed mechanism and the retraction mechanism are arranged in the handle body; the handle grip penetrates the handle end cover; the handle end cover is arranged on the handle body; and the plastic sleeve is arranged on the handle body.

3. The portable drain cleaning machine according to claim 2, wherein the feed mechanism comprises a feed rocker arm, a feed pressure roller, three feed bearings, a feed torsion spring, a feed pin shaft, and a feed housing;

the feed rocker arm is arranged on the advancing and retreating body through the feed pin shaft; the feed torsion spring is sleeved on the feed pin shaft; the feed rocker arm is provided with the feed pressure roller and the three feed bearings; the feed housing is sleeved on the advancing and retreating body; the feed housing is arranged in the handle body; the feed torsion spring comprises a first end abutting against the advancing and retreating body and a second end abutting against the feed rocker arm; the feed pressure roller is in contact with the feed housing; the three feed bearings are arranged obliquely; the three feed bearings form a flexible shaft feed channel; two of the three feed bearings are arranged on the feed rocker arm; and the other one of the three feed bearing is arranged on the advancing and retreating body.

4. The portable drain cleaning machine according to claim 2, wherein the retraction mechanism comprises a retraction rocker arm, a retraction pressure roller, three retraction bearings, a retraction torsion spring, a retraction pin shaft, and a retraction housing;

the retraction rocker arm is arranged on the advancing and retreating body through the retraction pin shaft; the retraction torsion spring is sleeved on the retraction pin shaft; the retraction rocker arm is provided with the retraction pressure roller and the three retraction bearings; the retraction housing is sleeved on the advancing and retreating body; the retraction housing is arranged in the handle body; the retraction torsion spring comprises a first end abutting against the advancing and retreating body and a second end abutting against the retraction rocker arm; the retraction pressure roller is in contact with the retraction housing; the three retraction bearings are arranged obliquely; the three retraction bearings form a flexible shaft retraction channel; two of the three retraction bearings are arranged on the retraction rocker arm; and the other one of the three retraction bearings is arranged on the advancing and retreating body.

5. The portable drain cleaning machine according to claim 1, wherein the casing device comprises a casing, a cover, a first flexible shaft sleeve, a motor clamping groove, a battery compartment, and a rubber pad;

the cover is arranged on the casing; the first flexible shaft sleeve is arranged on the cover; the motor clamping groove and the battery compartment are arranged in the casing; and the rubber pad is arranged at a bottom of the casing.

6. The portable drain cleaning machine according to claim 5, wherein the casing comprises a left casing and a right casing; the cover is arranged on the left casing and the right casing; a lifting handle is provided at a top of the casing, and a line clamping plate is provided at a rear of the casing; a line clamping groove is arranged between the line clamping plate and the casing; and a drum cavity configured to place the drum device is arranged between the cover and the casing.

7. The portable drain cleaning machine according to claim 5, wherein the motor device comprises a motor, a motor fixing plate, and a motor connecting shaft;

the motor fixing plate is arranged on the casing device; the motor is arranged on the motor fixing plate; the motor connecting shaft is arranged on an output shaft of the motor; the motor connecting shaft is connected with the drum device; and the motor is located in the motor clamping groove.

8. The portable drain cleaning machine according to claim 7, further comprising a battery, a charger, an airbag switch, a rocker switch, and a power display;

the battery is arranged in the battery compartment; the rocker switch and the power display are arranged on the casing; the battery, the airbag switch, and the rocker switch are connected with the motor; the charger is connected with the battery; and the battery is connected with the power display.

9. The portable drain cleaning machine according to claim 1, wherein the drum device further comprises a second flexible shaft sleeve and a flexible shaft seat;

the flexible shaft seat is arranged on the drum body; the second flexible shaft sleeve is arranged on the flexible shaft seat; and the second flexible shaft sleeve is sleeved outside the flexible shaft.

10. A drain cleaning method using a portable drain cleaning machine, comprising:

rotating a handle body counterclockwise to make a feed housing contact a feed pressure roller to move a feed rocker arm downward, locking a flexible shaft by feed bearings, driving a flexible shaft disc by a motor to rotate in a forward direction, and driving the flexible shaft by the feed bearings to rotate forward, to realize a feed function of the flexible shaft, wherein during reset, the feed rocker arm is reset upward through a feed torsion spring; and rotating the handle body clockwise to make a retraction housing contact a retraction pressure roller to move a retraction rocker arm downward, locking the flexible shaft by retraction bearings, driving the flexible shaft disc by the motor to rotate in the forward direction, and driving the flexible shaft by the retraction bearing to rotate rearward, to realize a retraction function of the flexible shaft, wherein during reset, the retraction rocker arm is reset upward through a retraction torsion spring.

* * * * *